US011201914B2

(12) United States Patent
Zhang

(10) Patent No.: US 11,201,914 B2
(45) Date of Patent: Dec. 14, 2021

(54) METHOD FOR PROCESSING A SUPER-HOT FILE, LOAD BALANCING DEVICE AND DOWNLOAD SERVER

(71) Applicant: WANGSU SCIENCE & TECHNOLOGY CO., LTD., Shanghai (CN)

(72) Inventor: Kai Zhang, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 371 days.

(21) Appl. No.: 16/472,692

(22) PCT Filed: Sep. 20, 2018

(86) PCT No.: PCT/CN2018/106644
§ 371 (c)(1),
(2) Date: Jun. 21, 2019

(87) PCT Pub. No.: WO2020/029380
PCT Pub. Date: Feb. 13, 2020

(65) Prior Publication Data
US 2021/0337019 A1    Oct. 28, 2021

(30) Foreign Application Priority Data
Aug. 10, 2018    (CN) .......................... 201810914368.7

(51) Int. Cl.
*G06F 15/16* (2006.01)
*H04L 29/08* (2006.01)
*H04L 29/12* (2006.01)

(52) U.S. Cl.
CPC ...... *H04L 67/1023* (2013.01); *H04L 61/6063* (2013.01); *H04L 67/06* (2013.01); *H04L 67/1014* (2013.01); *H04L 67/2842* (2013.01)

(58) Field of Classification Search
CPC . H04L 67/1023; H04L 67/06; H04L 67/1014; H04L 67/2842; H04L 61/6063
(Continued)

(56) References Cited

U.S. PATENT DOCUMENTS 6,651,141 B2 * 11/2003 Adrangi .............. G06F 12/0888
711/118
6,745,243 B2 * 6/2004 Squire ............... H04L 29/12009
709/227

(Continued)

FOREIGN PATENT DOCUMENTS

CN    101330509 A    12/2008
CN    101437051 A    5/2009
(Continued)

OTHER PUBLICATIONS

The China National Intellectual Property Administration (CNIPA) The China Search Report for 201810914368.7 dated June 22, 2020 4 Pages.

(Continued)

*Primary Examiner* — Alicia Baturay

(57) ABSTRACT

A method for processing a super-hot file includes: receiving a download request for a target file sent by a user client, and adding, into the download request, a cache parameter for indicating whether the target file is a super-hot file; matching an identifier of the target file against a super-hot file identifier library, and determining, according to a matching result, whether the target file is a super-hot file; if the target file is a super-hot file, generating a random identification code, and updating the cache parameter to a cache parameter indicating that the target file is a super-hot file; and determining a download server to which the random identifica-
(Continued)

tion code is mapped, and forwarding the download request including the updated cache parameter to the download server.

11 Claims, 5 Drawing Sheets

(58) Field of Classification Search
USPC .......................................................... 709/203
See application file for complete search history.

(56) References Cited

U.S. PATENT DOCUMENTS

| | | | | |
|---|---|---|---|---|
| 6,751,608 | B1* | 6/2004 | Cohen | G06F 16/9574 |
| 6,820,133 | B1* | 11/2004 | Grove | H04L 29/12066 |
| | | | | 709/238 |
| 6,888,836 | B1* | 5/2005 | Cherkasova | H04L 29/12066 |
| | | | | 370/400 |
| 6,959,436 | B2* | 10/2005 | Peng | H04L 29/06 |
| | | | | 719/310 |
| 7,076,544 | B2* | 7/2006 | Katz | H04L 29/06 |
| | | | | 709/223 |
| 7,769,823 | B2* | 8/2010 | Jenny | H04L 29/06 |
| | | | | 709/219 |
| 8,239,482 | B2* | 8/2012 | Reeser | H04L 67/28 |
| | | | | 709/217 |
| 8,543,702 | B1* | 9/2013 | Marshall | G06F 12/0811 |
| | | | | 709/226 |
| 8,583,762 | B2* | 11/2013 | Reeser | H04L 67/2852 |
| | | | | 709/218 |
| 8,863,227 | B2* | 10/2014 | Zhang | H04L 63/104 |
| | | | | 726/1 |
| 8,898,482 | B2* | 11/2014 | Templin | G06F 21/606 |
| | | | | 713/193 |
| 9,152,599 | B2* | 10/2015 | Blinick | G06F 15/167 |
| 9,338,095 | B2* | 5/2016 | Szabo | H04L 67/1002 |
| 9,451,040 | B2* | 9/2016 | Reeser | H04L 67/28 |
| 9,529,724 | B2* | 12/2016 | Jannyavula Venkata | G06F 12/0866 |
| 9,723,073 | B2* | 8/2017 | Maor | H04L 67/1095 |
| 9,747,592 | B2* | 8/2017 | Lientz | H04L 67/22 |
| 9,787,790 | B2* | 10/2017 | Reeser | H04L 69/28 |
| 9,948,970 | B2* | 4/2018 | Civiletto | H04N 21/2541 |
| 10,051,024 | B2* | 8/2018 | DuBose | H04L 65/60 |
| 10,084,605 | B2* | 9/2018 | Westberg | H04L 9/3242 |
| 10,277,705 | B2* | 4/2019 | Clavera | H04L 67/2842 |
| 10,331,573 | B2* | 6/2019 | Lewis | G06F 12/0891 |
| 10,348,848 | B2* | 7/2019 | Newton | H04L 67/2842 |
| 10,389,833 | B2* | 8/2019 | Reeser | H04L 67/28 |
| 10,503,792 | B1* | 12/2019 | Frieder | G06F 16/9574 |
| 10,613,983 | B2* | 4/2020 | Agarwal | G06F 12/0846 |
| 10,681,167 | B2* | 6/2020 | Srikanteswara | H04L 67/2842 |
| 10,721,295 | B2* | 7/2020 | Enguehard | H04L 67/1014 |
| 10,802,980 | B1* | 10/2020 | Shugaeva | H04L 47/286 |
| 10,880,395 | B2* | 12/2020 | Power | H04L 67/289 |
| 2003/0065743 | A1 | 4/2003 | Jenny et al. | |
| 2003/0225885 | A1* | 12/2003 | Rochberger | H04L 67/2847 |
| | | | | 709/226 |
| 2006/0005237 | A1* | 1/2006 | Kobata | H04L 63/123 |
| | | | | 726/12 |
| 2006/0106807 | A1* | 5/2006 | DeVitis | G06F 16/9574 |
| 2009/0125321 | A1* | 5/2009 | Charlebois | H04W 4/18 |
| | | | | 705/346 |
| 2013/0179931 | A1* | 7/2013 | Osorio | H04L 67/2842 |
| | | | | 725/110 |
| 2014/0052810 | A1* | 2/2014 | Osorio | H04N 21/2183 |
| | | | | 709/213 |
| 2014/0195686 | A1 | 7/2014 | Yeager et al. | |
| 2015/0003234 | A1* | 1/2015 | Samardzija | H04W 28/0231 |
| | | | | 370/229 |
| 2015/0201223 | A1* | 7/2015 | Osorio | H04L 67/2842 |
| | | | | 725/82 |
| 2015/0334204 | A1* | 11/2015 | Bilinski | H04N 21/25891 |
| | | | | 715/748 |
| 2015/0381756 | A1* | 12/2015 | Lotfallah | H04L 67/18 |
| | | | | 709/213 |
| 2016/0295429 | A1* | 10/2016 | Enqvist | H04W 28/0268 |
| 2018/0048731 | A1 | 2/2018 | Yeager et al. | |
| 2020/0219131 | A1* | 7/2020 | Isgar | G06F 3/0481 |
| 2020/0356578 | A1* | 11/2020 | Frieder | G06F 16/24522 |

FOREIGN PATENT DOCUMENTS

| | | |
|---|---|---|
| CN | 102523256 A | 6/2012 |
| CN | 103281394 A | 9/2013 |
| CN | 103686860 A | 3/2014 |
| CN | 104348841 A | 2/2015 |
| CN | 107169056 A | 9/2017 |
| CN | 107508758 A | 12/2017 |
| CN | 107770283 A | 3/2018 |

OTHER PUBLICATIONS

The World Intellectual Property Organization (WIPO) International Search Report and Written Opinion for PCT/CN2018/106644 dated Sep. 5, 2019 9 Pages.

* cited by examiner

METHOD FOR PROCESSING A SUPER-HOT FILE, LOAD BALANCING DEVICE AND DOWNLOAD SERVER

CROSS-REFERENCES TO RELATED APPLICATIONS

This application is a national phase entry under 35 U.S.C § 371 of International Application No. PCT/CN2018/106644 filed on Sep. 20, 2018, which claims priority of Chinese Patent Application No. 201810914368.7, filed with the State Intellectual Property Office of P. R. China on Aug. 10, 2018, the entire contents of all of which are incorporated herein by reference.

FIELD OF DISCLOSURE

The present disclosure generally relates to the field of Internet technology and, more particularly, relates to a method for processing a super-hot file, a load balancing device, and a download server thereof.

BACKGROUND

With the continuous development of Internet technology, the amount of data in the network is also increasing. Currently, a large number of download servers may be deployed in the network, where the download servers may process download requests initiated by user clients. Specifically, when a user client initiates a download request for a file, the download request may be forwarded by a load balancing device to a corresponding download server through a consistent hashing operation. The corresponding download server is then in charge of the processing of the download request.

However, for a super-hot file with an extremely large number of downloads, a single download server often cannot handle a tremendous amount of data traffic, thereby causing the download of the super-hot file to slow down, or even causing the loss of the resource of the super-hot file. Therefore, current approaches for processing super-hot files using a single download server has really poor stability.

BRIEF SUMMARY OF THE DISCLOSURE

The objective of the present disclosure is to provide a method for processing a super-hot file, a load balancing device, and a download server thereof, which may improve stability in the process of downloading a super-hot file.

To achieve the above objective, in one aspect, the present disclosure provides a method for processing a super-hot file. The method is applied to a load balancing server. The load balancing server is provided with a super-hot file identifier library, which is used for storing identifiers of super-hot files. The method includes: receiving a download request for a target file sent by a user client, and adding into the download request a cache parameter for indicating whether the target file is a super-hot file; matching an identifier of the target file against the super-hot file identifier library, and determining, according to a matching result, whether the target file is a super-hot file; if the target file is a super-hot file, generating a random identification code, and updating the cache parameter to a cache parameter indicating that the target file is a super-hot file; and determining a download server to which the random identification code is mapped, and forwarding the download request including the updated cache parameter to the download server.

To achieve the above objective, in another aspect, the present disclosure further provides a load balancing device. The load balancing device includes a load balancing system, which is configured to implement the above-described method.

To achieve the above objective, in another aspect, the present disclosure further provides a load balancing device. The load balancing device includes a processor and a memory. The memory is used for storing a super-hot file identifier library and a computer program. The super-hot file identifier library is used for storing the identifiers of super-hot filers. The computer program, when executed by the processor, implements the above-described method.

To achieve the above objective, in another aspect, the present disclosure further provides a method for processing a super-hot file. The method includes: receiving a download request, for a target file, sent by a load balancing device, where the download request includes a cache parameter for indicating whether the target file is a super-hot file; if the cache parameter indicates that the target file is a super-hot file, determining whether a currently recorded hotness value of the target file is less than a specified hotness threshold, and if the currently recorded hotness value of the target file is less than the specified hotness threshold, changing the currently recorded hotness value of the target file based on the specified hotness threshold and writing the target file into a cache; and detecting a super-hot file from respective files based on a current hotness value of each file, and feeding back, to the load balancing device, report information including an identifier of the detected super-hot file, to allow the load balancing device to store the identifier of the super-hot file included in the report information.

To achieve the above objective, in another aspect, the present disclosure further provides a download server. The download server includes a super-hot file processing system, which is configured to implement the above-described method(s).

To achieve the above objective, in another aspect, the present disclosure further provides a download server. The download server includes a processor and a memory. The memory is used for storing a computer program that, when executed by the processor, implements the above-described method(s).

As can be seen from the above, in the technical solutions provided by the present disclosure, the load balancing device may store in the local the identifiers of respective super-hot files in a super-hot file identifier library. Accordingly, after receiving a download request, sent by a user client, for a target file, the load balancing device may match the identifier of the target file against the super-hot file identifier library. If a same identifier is matched, it indicates that the target file is a super-hot file. At this point, the load balancing device may add a cache parameter, for indicating that the target file is a super-hot file, into the download request, and generate a random identification code. The random identification code may be used to randomly designate a download server. The load balancing device may then forward the download request to a randomly designated download server, so as to avoid that only a single download server is in charge of the downloading of the super-hot file. In this way, through distributing the download task of a super-hot file to multiple download servers, the stability of file downloading may thus be improved. In addition, after receiving the download request sent by the load balancing device, the download server may identify the cache parameter included therein. If the cache parameter indicates that the to-be-downloaded target file is a super-hot file, the download server may update the hotness value of the target file in the local. Specifically, the hotness value of the target file may be updated based on a specified hotness threshold, to allow the target file to be considered as a super-hot file by default. Then, the download server may cache the target file in the local, and later directly read the target file from the cache, thereby improving the reading speed of the target file. The download server may identify the super-hot files according to the current hotness value of each file, and feed back the identifiers of these super-hot files to the load balancing device, to allow the load balancing device to update the super-hot file identifier library. As can be seen, the process of identifying a super-hot file may be implemented by a download server. A download server may identify, from the cache parameter of the download request, whether a to-be-downloaded file is a super-hot file. If the to-be-downloaded file is a super-hot file, the download server may automatically set the hotness value of the file to be higher than the specified hotness threshold, and starts to execute a policy for caching the super-hot file. Therefore, the load balancing device does not need to calculate the hotness value of each file. After forwarding the download request for a super-hot file to a random download server, the load balancing device does not need to update the hotness value of the super-hot file in that download server, but rather let the download server to update by itself, thereby releasing the pressure of the load balancing device. Accordingly, the stability of the process of downloading a super-hot file may be further improved.

BRIEF DESCRIPTION OF THE DRAWINGS

To make the technical solutions in the embodiments of the present disclosure clearer, a brief introduction of the accompanying drawings consistent with descriptions of the embodiments will be provided hereinafter. It is to be understood that the following described drawings are merely some embodiments of the present disclosure. Based on the accompanying drawings and without creative efforts, persons of ordinary skill in the art may derive other drawings.

DETAILED DESCRIPTION

To make the objective, technical solutions, and advantages of the present disclosure clearer, the implementations of the present disclosure will be made in detail hereinafter with reference to the accompanying drawings.

The disclosed implementation provides a method for processing a super-hot file. The method may be applied to a load balancing device. The load balancing device may be an nginx-based device. The load balancing device may include a super-hot file identifier library. The super-hot file identifier library may store identifiers of the already known super-hot files. The identifier of a super-hot file may be, for example, a URL (Uniform Resource Locator) for locating the super-hot file, or a unique character string designated to a super-hot file. Specifically, the super-hot file identifier library may reside in, for example, a shared memory dictionary entry ngx.shared.DICT.

Figure 1:
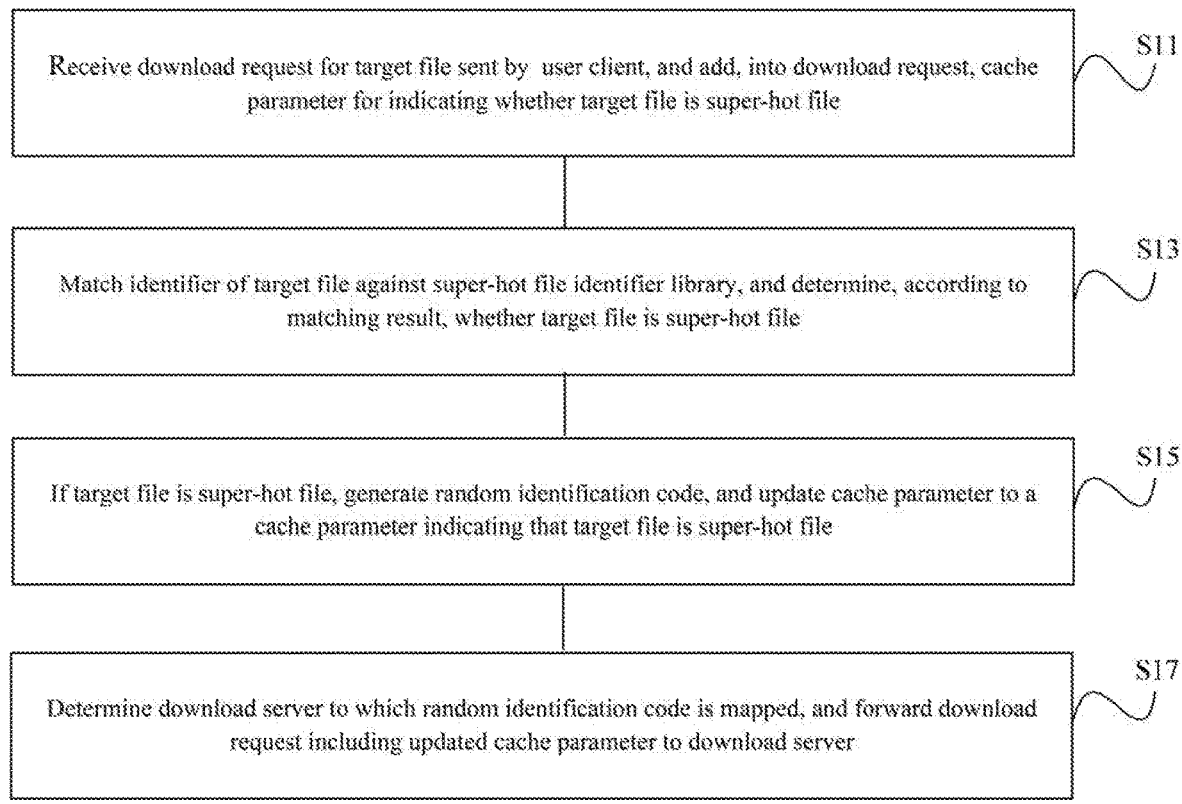
FIG. 1 is a flowchart of a method for processing a super-hot file executed by a load balancing device according to some embodiments of the present disclosure.
Figure 2:
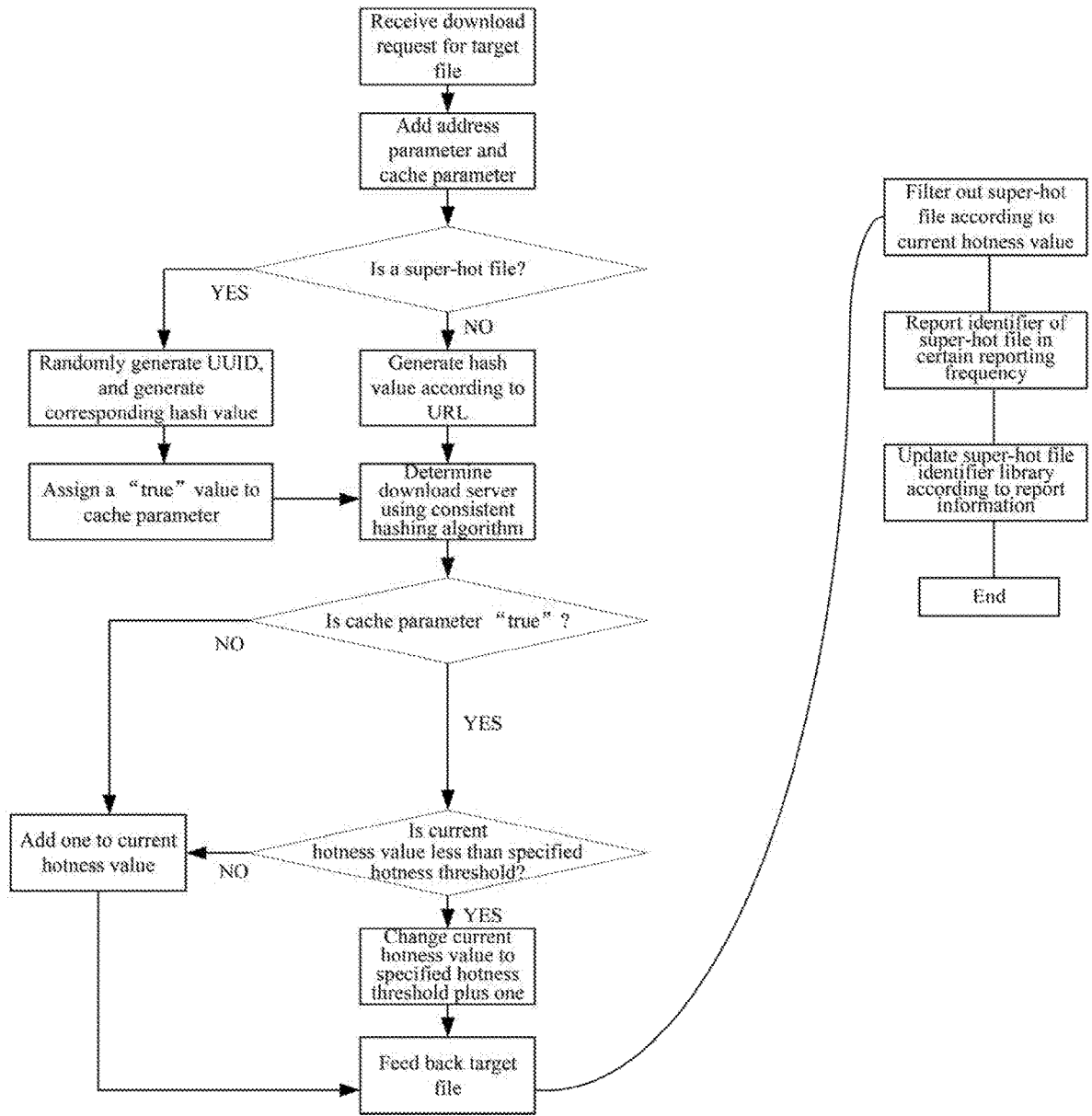
FIG. 2 is a flow diagram of a method for processing a super-hot file according to some embodiments of the present disclosure.

Referring to FIG. 1 and FIG. 2, the method for processing a super-hot file may include the following steps according to the disclosed implementation.

S11: Receive a download request sent by a user client for a target file, and add, into the download request, a cache parameter for indicating whether the target file is a super-hot file.

In the disclosed implementation, after receiving a download request sent by a user client for a target file, the load balancing device may add into the download request a cache parameter for indicating whether the target file is a super-hot file. The cache parameter may be assigned a "true" or "false" value. When the cache parameter is set to "true", the file to be downloaded is a super-hot file. When the cache parameter is set to "false", the file is not a super-hot file.

In real applications, the cache parameter may be added to a file header field of the download request. The default value of the cache parameter is set to "false" to concede that a target file is not a super-hot file by default.

In one implementation, the load balancing device may further add an address parameter, for indicating the communication address of the load balancing device, in the file header field of the download request. The address parameter may be identified by a download server. Subsequently, the download server may exchange data with the load balancing device based on the identified communication address.

S13: Match an identifier of the target file against the super-hot file identifier library, and determine, according to a matching result, whether the target file is a super-hot file.

In the disclosed implementation, after the identifier of the target file is identified from the download request, the identifier of the target file may be matched against the super-hot file identifier library. If a same identifier is matched, it means that the target file is a super-hot file. On the contrary, if no matching identifier is found in the super-hot file identifier library, the target file is not a super-hot file at this moment.

S15: If the target file is a super-hot file, generate a random identification code, and update the cache parameter to a cache parameter that indicates that the target file is a super-hot file.

S17: Determine a download server to which the random identification code is mapped, and forward the download request including the updated cache parameter to the download server.

In the disclosed implementation, if the target file is a super-hot file, the load balancing device may update the cache parameter added to the download request to a cache parameter that indicates the target file as a super-hot file, that is, change the cache parameter from the default "false" value to a "true" value. In addition, since the target file is a super-hot file, it is necessary to avoid sending all the download requests for the target file to a same download server for processing. At this point, the load balancing device may generate a random UUID (Universally Unique Identifier), calculate a hash value for the random UUID by using a consistent hashing algorithm, and then take a server designated by the hash value as the download server for processing the download request. For instance, assuming that there are 10 download servers associated with the load balancing device, for the download requests for a super-hot file, the load balancing device may distribute the download requests for the super-hot file to 10 download servers by generating random UUIDs and by using a consistent hashing algorithm. This may then prevent all the download requests towards this super-hot file from being processed by a single download server.

In the disclosed implementation, after the corresponding download server for the current download request is determined based on the randomly generated identification code, and after the cache parameter in the download request is updated to the "true" value, the download request, including the updated cache parameter, may be forwarded to the download server, to allow the randomly designated download server to process the current download request for the target file.

It should be noted that, if the target file is not a super-hot file, the identification code may be not randomly generated and the assigned value for the cache parameter may not be changed. Instead, the URL for the target file is used as a key for the consistent hashing algorithm, to calculate a download server to which the URL is mapped. The download request, including the default value of the cache parameter, may be then forwarded to the download server to which the identifier of the target file is mapped. That is, for a file that is not a super-hot file, a single download server may be used to process all download requests towards the file.

Figure 3:
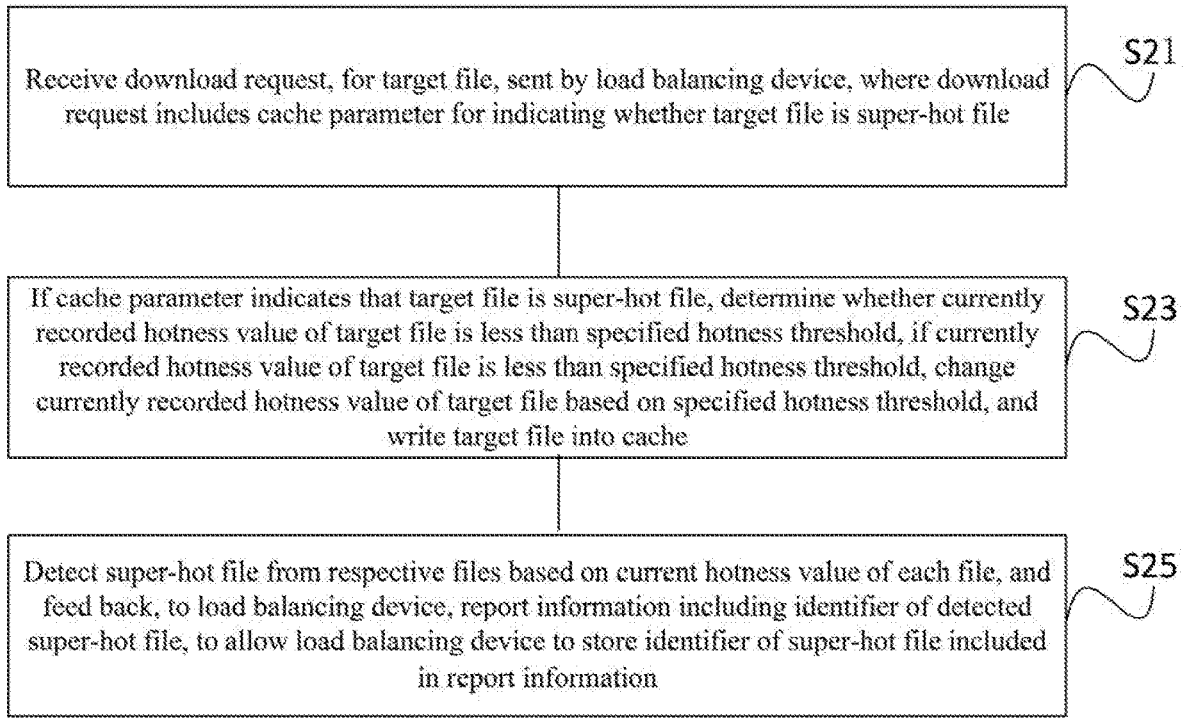
FIG. 3 is a flowchart of a method for processing a super-hot file executed by a download server according to some embodiments of the present disclosure.

Referring to FIG. 2 and FIG. 3, the download server may process the received download request according to the following steps.

S21: Receive a download request, sent by the load balancing device, for a target file, where the download request includes a cache parameter for indicating whether the target file is a super-hot file.

S23: If the cache parameter indicates that the target file is a super-hot file, determine whether the currently recorded hotness value of the target file is less than a specified hotness threshold, and if the currently recorded hotness value of the target file is less than a specified hotness threshold, modify the current hotness value of the target file based on the specified hotness threshold and write the target file into a cache.

In the disclosed implementation, after receiving a download request sent by the load balancing device, the download server may identify the address parameter and the cache parameter from the file header field of the download request. For the cache parameter, according to its current value, it may be determined whether the target file referred in the download request is a super-hot file. In each download server, the hotness value of each file may be respectively recorded. The hotness value may be continuously accumulated with the number of times when the download server downloads the corresponding file. For example, if the download server downloads a target file 10 times, the target file may have a hotness value of 10 in the download server.

In the disclosed implementation, each download server may also preset a specified hotness threshold. This threshold may be used to differentiate between a super-hot file and a file that is not a super-hot file. Specifically, when the hotness value of a target file accumulated in a download server is greater than the specified hotness threshold, the target file may be considered as a super-hot file.

In real applications, if the target file is a super-hot file, the load balancing device randomly designates one of the download servers to process the download request for the target file. At this moment, a designated download server may be the first time to process the download request of the target file, and thus does not have an accumulated hotness value of the target file in the local. In order to match the accumulated hotness value of the target file to the actual situation, the designated download server may perform recognition on the download request for the target file. When it is recognized that the cache parameter included in the download request indicates that the target file is a super-hot file, it may be further determined whether the locally recorded hotness value of the target file at present is less than the preset specified hotness threshold. If the locally recorded hotness value of the target file at present is less than the preset specified hotness threshold, it means that the accumulated hotness value, of the target file, monitored by the randomly designated download server needs to be updated, to allow an updated accumulated hotness value to match the actual value. Specifically, the download server may modify the current hotness value of the target file based on the specified hotness threshold. In real applications, the current hotness value of the target file may be changed to the sum of the specified hotness threshold and a specified positive integer. The specified positive integer may be, for example, one. In this way, the changed accumulated hotness value is greater than the specified hotness threshold, which is then consistent with the fact that the target file is a super-hot file. As can be seen, when the load balancing device randomly designates a new download server to process a download request for a super-hot file, the new download server may automatically set the locally accumulated hotness value for the target file based on the actual value of the cache parameter in the download request, without requiring the load balancing device to conduct any adjustment, thereby reducing the burden on the load balancing device.

In one implementation, when the cache parameter indicates that the target file is a super-hot file, and when the currently recorded hotness value of the target file is also greater than or equal to the specified hotness threshold, it means that the hotness value of the target file has already been accumulated or updated in the local of the download server, and that the hotness value of the target file also indicates that the target file is a super-hot file. At this moment, the hotness value of the target file may be changed to be the sum of the currently recorded hotness value and a specified positive integer. The specified positive integer may be, for example, one. Correspondingly, the currently recorded hotness value is added by one. Afterwards, the target file may be fed back to the load balancing device. It should be noted that the target file may be initially stored in the memory of a download server. Since the target file is a super-hot file, in order to improve the speed of feeding back the target file, the target file may be written into a cache. Later, the target file may be directly read from the cache, thereby increasing the speed of reading the file.

In one implementation, if the cache parameter, in the download request for the target file, indicates that the target file is not a super-hot file, it means that the load balancing server determines the download server through the calculation using the consistent hashing algorithm based on the URL of the target file. This download server may process all download requests for the target file when the target file has not yet become a super-hot file. On the download server, each time a download request for the target file is received, the hotness value of the target file may be increased by one, so that the hotness value of the target file may be accumulated. The download server may then feed back the target file to the load balancing device according to the normal logic. In addition, when the accumulated hotness value of the target file reaches the specified hotness threshold, it means that the target file has already become a super-hot file. To accelerate the speed of reading the super-hot file, the target file may be written into the cache.

It should be noted that, when the hotness value of a file is accumulated as described above, the hotness value may be accumulated only within a certain time limit. If the time limit is passed, the accumulated hotness value may be cleared to zero and re-accumulated. For example, for a specific file, its hotness value may be accumulated within 12 hours. After 12 hours, its hotness value may be cleared to zero and the next 12-hour hotness value accumulation process restarts. The reason for such processing is that the hotness values for some files may accumulate over time and eventually reach the specified hotness threshold, but these files do not bring about burst download traffic in a short time period and thus should not be considered as super-hot files.

S25: Detect a super-hot file from respective files based on a current hotness value of each file, and feed back report information including an identifier of the detected super-hot file to the load balancing device, to allow the load balancing device to store the identifier of the detected super-hot file included in the report information.

In the disclosed implementation, a download server may perform Steps S21 and S23 for the download requests of each file. Thus, in the download server, the accumulated hotness value of each file may be recorded. The download server may periodically check the current hotness value of each file in the local according to a certain time cycle, to sort out super-hot files. Specifically, the download server may consider a file with a current hotness value greater than or equal to the specified hotness threshold as a super-hot file. After a super-hot file is detected, the download server may feed back report information including the identifier of the detected super-hot file to the load balancing device. In this way, the load balancing device may receive the report information fed back by the download server based on the communication address included in the address parameter, and write the identifier of the super-hot file included in the report information into the super-hot file identifier library. Specifically, when writing the identifier of the super-hot file included in the report information into the super-hot file identifier library, the load balancing device may determine whether the identifier of the super-hot file included in the report information has been already stored in the super-hot file identifier library. If the identifier of the super-hot file included in the report information has been already stored, this stored identifier of the super-hot file may be upgraded to the top position in the super-hot file identifier library. If the identifier of the super-hot file included in the report information has not been stored yet, the identifier of the super-hot file included in the report information may be written into the top position of the super-hot file identifier library. In this way, according to a ranking order, an identifier stored in the super-hot file identifier library may indicate a status of recent triggering activities for each identifier. The load balancing device may eliminate an identifier located at the bottom of the super-hot file identifier library based on an LRU (Least Recently Used) algorithm. Specifically, if the super-hot file identifier library is already full of data when the identifier of a super-hot file is written, the identifier at the bottom of the super-hot file identifier library may be eliminated, thereby providing storage space for the to-be-written identifier of the super-hot file. Consequently, the to-be-written identifier may be written to the top position of the super-hot file identifier library.

In one implementation, the download request sent by the load balancing device includes an address parameter that indicates a communication address of the load balancing device. In this way, the download server may identify the communication address of the load balancing device from the download request sent by the load balancing device, and transmit the report information including the identifier of the detected super-hot file to the load balancing device indicated by the communication address.

In one implementation, in order to prevent a download server from frequently feeding back the report information to the load balancing device after detecting a super-hot file, a specified reporting frequency may be preset. Afterwards, the report information may be fed back to the load balancing device according to the specified reporting frequency. Another advantage of setting a specified reporting frequency lies in that: the load balancing device may periodically delete some identifiers in the super-hot file identifier library; and the principle of deletion is that: if the identifier of a super-hot file is not reported by the download server for a long time, the load balancing device will consider that this identifier has lost its hotness and thus remove this identifier from the super-hot file identifier library. The download server consistently reports the identifier of a super-hot file according to the specified reporting frequency, instead of only reporting once the identifier of the super-hot file, so that the activeness of the identifier of the super-hot file may be maintained on the load balancing device, thereby ensuring the identifier of the super-hot file not to be deleted.

The present disclosure further provides a load balancing device. The load balancing device includes a load balancing system. The load balancing system is configured to implement the above-described methods executed by the load balancing device for processing a super-hot file.

Figure 4:
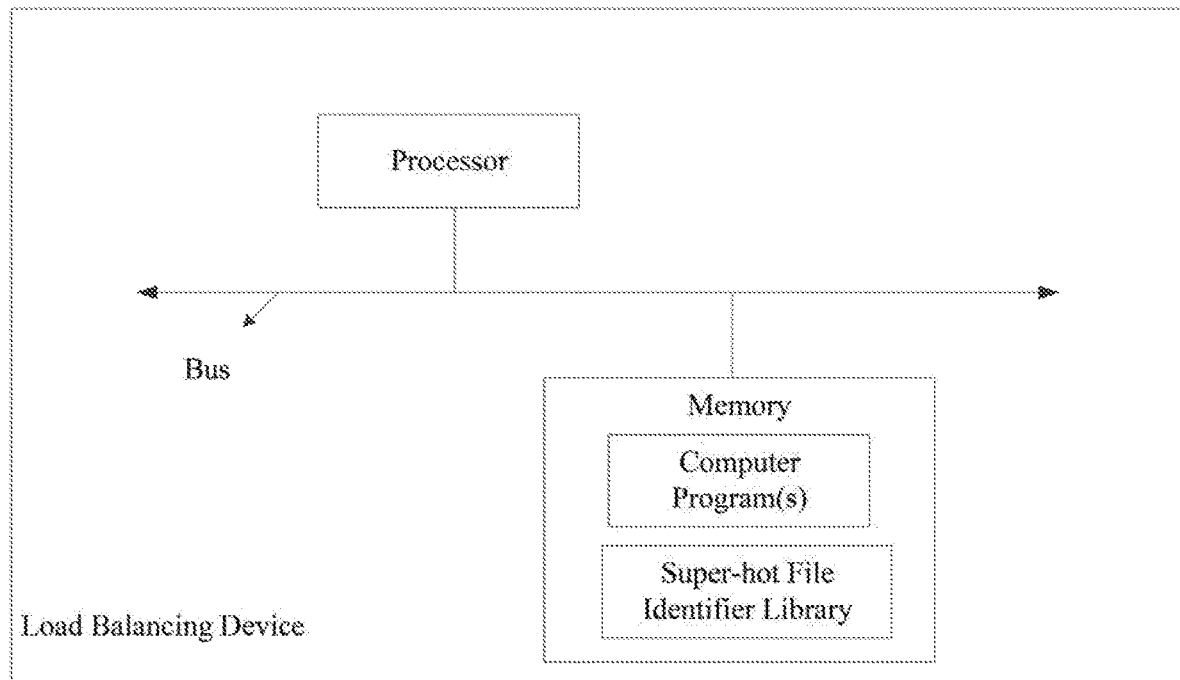
FIG. 4 is a schematic structural diagram of a load balancing device according to some embodiments of the present disclosure.

Referring to FIG. 4, the present disclosure further provides a load balancing device. The load balancing device includes a memory and a processor. The memory is used to store a super-hot file identifier library and a computer program. The super-hot file identifier library is used for storing identifiers of super-hot files. The computer program, when the executed by the processor, implements the above-described methods executed by the load balancing device for processing a super-hot file.

The present disclosure further provides a download server. The download server includes a processing system for a super-hot file. The processing system for a super-hot file is configured to implement the above-described methods executed by the download server for processing a super-hot file.

Figure 5:
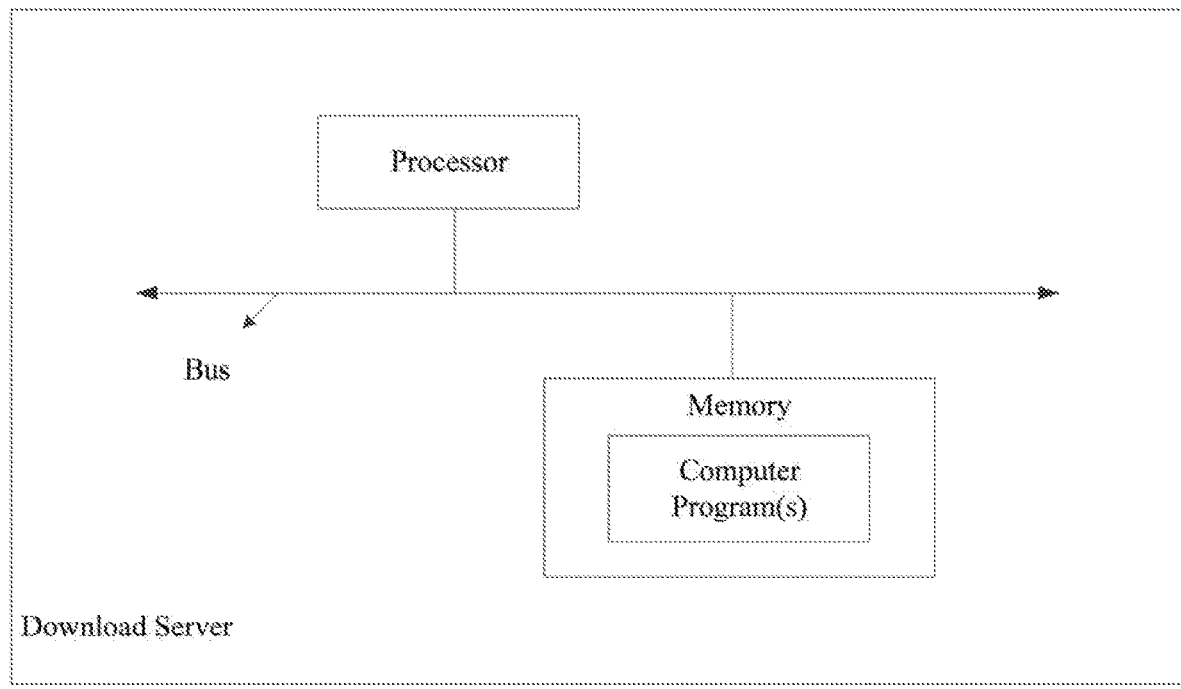
FIG. 5 is a schematic structural diagram of a download server according to some embodiments of the present disclosure.

Referring to FIG. 5, the present disclosure further provides a download server. The download server includes a memory and a processor. The memory is used to store a computer program that, when executed by the processor, implement the above-described methods executed by the download server for processing a super-hot file.

As can be seen from the above, in the technical solutions provided by the present disclosure, the load balancing device may store in the local the identifiers of respective super-hot files in a super-hot file identifier library. Accordingly, after receiving a download request, sent by a user client, for a target file, the load balancing device may match the identifier of the target file against the super-hot file identifier library. If a same identifier is matched, it indicates that the target file is a super-hot file. At this point, the load balancing device may add a cache parameter, for indicating that the target file is a super-hot file, into the download request, and generate a random identification code. The random identification code may be used to randomly designate a download server. The load balancing device may then forward the download request to a randomly designated download server, so as to avoid that only a single download server is in charge of implementing the downloading of the super-hot file. In this way, through distributing the download task of a super-hot file to multiple download servers, the stability of file downloading may thus be improved. In addition, after receiving the download request sent by the load balancing device, the download server may identify the cache parameter included therein. If the cache parameter indicates that the to-be-downloaded target file is a super-hot file, the download server may update the hotness value of the target file in the local. Specifically, the hotness value of the target file may be updated based on a specified hotness threshold, to allow the target file to be considered as a super-hot file by default. Then, the download server may cache the target file in the local, and later directly read the target file from the cache, thereby improving the reading speed of the target file. The download server may identify the super-hot files according to the current hotness value of each file, and feed back the identifiers of these super-hot files to the load balancing device, to allow the load balancing device to update the super-hot file identifier library. As can be seen, the process of identifying a super-hot file may be implemented by a download server. A download server may identify, from the cache parameter of the download request, whether a to-be-downloaded file is a super-hot file. If the to-be-downloaded file is a super-hot file, the download server may automatically set the hotness value of the file to be higher than the specified hotness threshold, and starts to execute a policy for caching the super-hot file. Therefore, the load balancing device does not need to calculate the hotness value of each file. After forwarding the download request for a super-hot file to a random download server, the load balancing device does not need to update the hotness value of the super-hot file in that download server, but rather let the download server to update by itself, thereby releasing the pressure of the load balancing device. Accordingly, the stability of the process of downloading a super-hot file may be further improved.

Through the foregoing description of the disclosed embodiments, a person skilled in the art may clearly understand that the respective embodiments may be implemented by means of software plus a necessary general hardware platform, and apparently, may be also implemented by hardware. In view of this understanding, the above-described technical solutions, or essentially the parts that contribute to the existing technologies, may be embodied in the form of software products. The software products may be stored in a computer-readable storage medium, such as ROM/RAM, magnetic disc, optical disc, etc., and include a series of instructions that are configured to cause a computer device (which may be a personal computer, server, or network device, etc.) to implement the methods described in the respective embodiments or portions of the embodiments.

Although the present disclosure has been described as above with reference to preferred embodiments, these embodiments are not to be constructed as limiting the present disclosure. Any modifications, equivalent replacements, and improvements made without departing from the spirit and principle of the present disclosure shall fall within the scope of the protection of the present disclosure.

What is claimed is:

1. A method for processing a super-hot file, the method being applied to a load balancing device, wherein the load balancing device includes a super-hot file identifier library, and the super-hot file identifier library stores identifiers of super-hot files, and the method comprising:

receiving a download request for a target file sent by a user client, and adding, into the download request, a cache parameter for indicating whether the target file is a super-hot file;

matching an identifier of the target file against the super-hot file identifier library, and determining, according to a matching result, whether the target file is a super-hot file;

if the target file is a super-hot file, generating a random identification code, and updating the cache parameter to a cache parameter indicating that the target file is a super-hot file; and determining a download server to which the random identification code is mapped, and forwarding the download request including the updated cache parameter to the download server.

2. The method according to claim 1, wherein a default value of the cache parameter added into the download request indicates that the target file is not a super-hot file, and the method further includes:

if the target file is not a super-hot file, determining a download server to which the identifier of the target file is mapped, and forwarding the download request including the default value of the cache parameter to the download server to which the identifier of the target file is mapped.

3. The method according to claim 1, wherein:

after receiving the download request for the target file sent by the user client, the method further includes:

adding, into the download request, an address parameter for indicating a communication address of the load balancing device; and after forwarding the download request including the updated cache parameter to the download server, the method further includes:

receiving report information fed back by the download server based on the communication address included in the address parameter, wherein the report information includes an identifier of the super-hot file, and writing the identifier of the super-hot file included in the report information into the super-hot file identifier library.

4. The method according to claim 3, wherein writing the identifier of the super-hot file included in the report information into the super-hot file identifier library further includes:

determining whether the identifier of the super-hot file included in the report information has been stored in the super-hot file identifier library; and if the identifier of the super-hot file included in the report information has been stored in the super-hot file identifier library, upgrading the stored identifier of the super-hot file to a top position in the super-hot file identifier library, and if the identifier of the super-hot file included in the report information has not been stored in the super-hot file identifier library, writing the identifier of the super-hot file included in the report information to the top position in the super-hot file identifier library, wherein:

if the super-hot file identifier library is full of data when the identifier of the super-hot file included in the report information is written, deleting an identifier at the bottom of the super-hot file identifier library, to provide storage space for the identifier of the to-be-written super-hot file.

5. A method for processing a super-hot file, comprising:
receiving a download request, for a target file, sent by a load balancing device, wherein the download request includes a cache parameter for indicating whether the target file is a super-hot file;
if the cache parameter indicates that the target file is a super-hot file, determining whether a currently recorded hotness value of the target file is less than a specified hotness threshold, and if the currently recorded hotness value of the target file is less than the specified hotness threshold, changing the currently recorded hotness value of the target file based on the specified hotness threshold and writing the target file into a cache; and
detecting a super-hot file from respective files based on a current hotness value of each file, and feeding back, to the load balancing device, report information including an identifier of the detected super-hot file, to allow the load balancing device to store the identifier of the super-hot file included in the report information.

6. The method according to claim 5, wherein changing the current hotness value of the target file based on the specified hotness threshold further includes:
changing the current hotness value of the target file to a sum of the specified hotness threshold and a specified positive integer.

7. The method according to claim 5, further comprising:
if the currently recorded hotness value of the target file is greater than or equal to the specified hotness threshold, changing a hotness value of the target file to a sum of the currently recorded hotness value and a specified positive integer, feeding back the target file to the load balancing device, and writing the target file into a cache.

8. The method according to claim 5, further comprising:
if the cache parameter indicates that the target file is not a super-hot file, accumulating a hotness value of the target file; and
if the accumulated hotness value of the target file reaches the specified hotness threshold, writing the target file into a cache, and feeding back the report information including the identifier of the target file to the load balancing device.

9. The method according to claim 5, wherein the download request sent by the load balancing device further includes an address parameter for indicating a communication address of the load balancing device; and feeding back, to the load balancing device, the report information including the identifier of the detected super-hot file further includes:
identifying the communication address of the load balancing device from the download request sent by the load balancing device, and sending the report information including the identifier of the detected super-hot file to the load balancing device designated by the communication address.

10. The method according to claim 5, wherein the report information including the identifier of the detected super-hot file is fed back to the load balancing device according to a specified reporting frequency.

11. A download server, comprising a memory and a processor, wherein
the memory stores a computer program that, when executed by the processor, implements a method for processing a super-hot file, wherein the method includes:
receiving a download request, for a target file, sent by a load balancing device, wherein the download request includes a cache parameter for indicating whether the target file is a super-hot file;
if the cache parameter indicates that the target file is a super-hot file, determining whether a currently recorded hotness value of the target file is less than a specified hotness threshold, and if the currently recorded hotness value of the target file is less than the specified hotness threshold, changing the currently recorded hotness value of the target file based on the specified hotness threshold and writing the target file into a cache; and
detecting a super-hot file from respective files based on a current hotness value of each file, and feeding back, to the load balancing device, report information including an identifier of the detected super-hot file, to allow the load balancing device to store the identifier of the super-hot file included in the report information.

* * * * *